US009466030B2

(12) United States Patent
Jackson et al.

(10) Patent No.: US 9,466,030 B2
(45) Date of Patent: Oct. 11, 2016

(54) IMPLEMENTING STOCHASTIC NETWORKS USING MAGNETIC TUNNEL JUNCTIONS

(75) Inventors: Bryan L. Jackson, Fremont, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 13/600,171

(22) Filed: Aug. 30, 2012

(65) Prior Publication Data
US 2015/0262071 A1    Sep. 17, 2015

(51) Int. Cl.
*G06N 7/00* (2006.01)
*G06N 5/04* (2006.01)

(52) U.S. Cl.
CPC .............. *G06N 7/005* (2013.01); *G06N 5/048* (2013.01)

(58) Field of Classification Search
None
See application file for complete search history.

(56) References Cited

U.S. PATENT DOCUMENTS

| 5,170,071 | A | 12/1992 | Shreve | |
| 5,793,697 | A * | 8/1998 | Scheuerlein | 365/230.07 |
| 6,490,192 | B2 * | 12/2002 | Thewes et al. | 365/158 |
| 7,555,468 | B2 | 6/2009 | El-Damhougy | |
| 2010/0109656 | A1 * | 5/2010 | Wang et al. | 324/210 |
| 2010/0109660 | A1 | 5/2010 | Wang et al. | |
| 2010/0131578 | A1 | 5/2010 | Fukushima et al. | |
| 2011/0153533 | A1 * | 6/2011 | Jackson et al. | 706/17 |

OTHER PUBLICATIONS

Pedro L. Lopez-Cruz, Concha Bielza, Pedro Larranaga, Ruth Benavides-Piccone, Javier DeFelipe, "Models and Simulation of 3D Neronal Dentritic Trees Using Bayesian Networks", Neuroinform, vol. 9, 2011, pp. 347-369.*
Michael Jordan, Zoubin Ghahramani, Tommi Jaakkola, Sawrence Saul, "Introduction fo Variational Methods for Graphical Models", Machine Learning, vol. 37, 1999, pp. 183-233.*
Jian-Gang (Jimmy) Zhu and Chando Park, "Magnetic Field Junctions", MaterialsToday, vol. 9, No. 11, Nov 2006, pp. 36-45.*
Yue Zhang, Weisheng Zhao, Klein, J.-O., Wang Kang, Querlioz, D., Chappert, C., Ravelosona, D., "Multi-level cell Spin Transfer Torque MRAM based on stochastic switching", Nanotechnology (IEEE-NANO), Proceedings of the 13th IEEE International Conference on Nanotechnology, Beijing, China, Aug. 5-8, 2013, pp. 233-236.*
J. R. Koiter, "Visualizing Inference in Bayesian Networks", Master of Science Thesis published by Delft University of Technology, Delft, Netherlands, Jun. 2006, pp. 1-117.*
Norsys Software Staff, "Tutorial on Bayesian Networks with Netica, Section D. Advanced Topics", Norsys Sofware Corporation, Vancouver, BC, Canada, 2015, pp. 1-6.*

(Continued)

*Primary Examiner* — Kakali Chaki
*Assistant Examiner* — Walter Hanchak
(74) *Attorney, Agent, or Firm* — Sherman IP LLP; Kenneth L. Sherman; Hemavathy Perumal

(57) ABSTRACT

Embodiments of the invention relate to implementing a probabilistic graphical model (PGM) using magnetic tunnel junctions (MTJs). One embodiment comprises a memory array of magnetic tunnel junctions and a driver unit for programming the memory array to represent a probabilistic graphical model. The magnetic tunnel junctions are organized into multiple subsets of magnetic tunnel junctions. The driver unit selectively applies an electrical pulse to a subset of magnetic tunnel junctions to program information representing a probabilistic belief state in said subset of magnetic tunnel junctions.

20 Claims, 9 Drawing Sheets

(56) References Cited

OTHER PUBLICATIONS

Uffe B Kjaerulff and Anders L. Madsen, "Probabilistic Networks—An Introduction to Bayesian Networks and Influence Diagrams", "http://people.cs.aau.dk/~uk/papers/pgm-book-I-05.pdf", May 10, 2005, pp. 1-133.*

Jian-Gang (Jimmy) Zhu and Chando Park, "Magnetic Field Junctions", MaterialsToday, vol. 9, No. 11, Nov. 2006, pp. 36-45.*

Praveen Venkataramani, Saket Srivastava and Sanjukta Bhanja, "Sequential Circuit Design in Quantum Dot Cellular Automata (QCA)", Circuits and Systems (ICCAS), 2012 IEEE International Conference on, Oct. 4, 2012, pp. 162-167.*

David Spiegelhalter, Andrew Thomas, Nicky Best, Dave Lunn, "WinBUGS User Manual, Version 1.4", "https://faculty.washington.edu/jmiyamot/p548/spiegelhalter%20winbugs%20user%20manual.pdf", Jan. 2003, pp. 1-60.*

Bakis, R. et al., "Statistical Training on Artificial Neural Networks," IBM Technical Disclosure Bulletin, Mar. 1, 1990, pp. 421-422, vol. 32, No. 10B, IBM Corporation, USA.

Fox, G.C. et al., "Load Balancing by a Neural Network," C3P363, Oct. 31, 1986, 55 pages, Software Patent Institute, USA.

Zhao, J., "Dynamic Background Discrimination with a Recurrent Network," Proceedings of the First International Conference on Advances in Natural Computation (ICNC '05), 2005, pp. 432-437, Springer-Verlag Berlin, Heidelberg, Germany.

\* cited by examiner

IMPLEMENTING STOCHASTIC NETWORKS USING MAGNETIC TUNNEL JUNCTIONS

This invention was made with Government support under HR0011-09-C-0002 awarded by Defense Advanced Research Projects Agency (DARPA). The Government has certain rights in this invention.

BACKGROUND

Embodiments of the invention relate to stochastic networks, and in particular, implementing a probabilistic graphical model (PGM) using magnetic tunnel junctions (MTJs).

A PGM is a graphical model denoting conditional independence between random variables. PGMs include Bayesian networks and Markov networks. Applications of PGMs include credit scoring, insurance, genetic inheritance, diagnosis of disease, optical character recognition (OCR), image segmentation in the field of computer vision, decision making, prenatal screening, person recognition, motion sensing, and artificial neural networks.

BRIEF SUMMARY

Embodiments of the invention relate to implementing a probabilistic graphical model (PGM) using magnetic tunnel junctions (MTJs). One embodiment comprises a memory array of magnetic tunnel junctions and a driver unit for programming the memory array to represent a probabilistic graphical model. The magnetic tunnel junctions are organized into multiple subsets of magnetic tunnel junctions. The driver unit selectively applies an electrical pulse to a subset of magnetic tunnel junctions to program information representing a probabilistic belief state in said subset of magnetic tunnel junctions.

Another embodiment comprises organizing magnetic tunnel junctions of a memory array into multiple subsets of magnetic tunnel junctions, and programming the memory array to represent a probabilistic graphical model. An electrical pulse is selectively applied to at least one subset of magnetic tunnel junctions, such that information representing a probabilistic belief state is programmed in said at least one subset of magnetic tunnel junctions.

These and other features, aspects and advantages of the present invention will become understood with reference to the following description, appended claims and accompanying figures.

DETAILED DESCRIPTION

Figure 1:
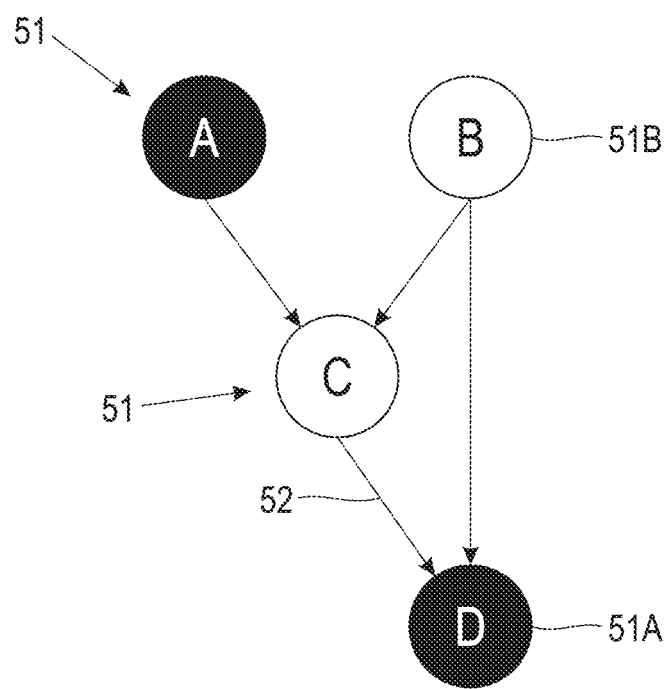
FIG. 1 illustrates a probabilistic graphical model.

Embodiments of the invention relate to implementing a probabilistic graphical model (PGM) using magnetic tunnel junctions (MTJs). One embodiment comprises a memory array of magnetic tunnel junctions and a driver unit for programming the memory array to represent a probabilistic graphical model. The magnetic tunnel junctions are organized into multiple subsets of magnetic tunnel junctions. The driver unit selectively applies an electrical pulse to a subset of magnetic tunnel junctions to program information representing a probabilistic belief state in said subset of magnetic tunnel junctions.

Another embodiment comprises organizing magnetic tunnel junctions of a memory array into multiple subsets of magnetic tunnel junctions, and programming the memory array to represent a probabilistic graphical model. An electrical pulse is selectively applied to at least one subset of magnetic tunnel junctions, such that information representing a probabilistic belief state is programmed in said at least one subset of magnetic tunnel junctions.

The probabilistic graphical model comprises multiple nodes interconnected via multiple edges. Each subset of magnetic tunnel junctions corresponds to a node of the probabilistic graphical model. In one embodiment, the edges of the probabilistic graphical model are arranged in a directed acyclic graph.

The driver unit maintains configurable network definition data relating to the probabilistic graphical model. The network definition data includes edge connectivity information for said multiple nodes of the probabilistic graphical model.

Each electrical pulse applied by the driver unit has a magnitude and a pulse width. The magnitude and the pulse width of each electrical pulse applied is based on the network definition data maintained.

The nodes of the probabilistic graphical model include at least one observed node and at least one unobserved node. Each observed node has an observed probabilistic belief state. Each unobserved node has an estimated probabilistic belief state. The network definition data further includes evidence information for each observed node of the probabilistic graphical model.

For each observed node of the probabilistic graphical model, the driver unit applies an electrical pulse to a subset of magnetic tunnel junctions corresponding to the observed node. The electrical pulse applied programs information representing an observed probabilistic belief state in the subset of magnetic tunnel junctions corresponding to the observed node. The observed probabilistic belief state is based on evidence information for the observed node.

For each unobserved node of the probabilistic graphical model, the driver unit estimates a probabilistic belief state for the unobserved node based on an inference algorithm and the network definition data maintained. The driver unit applies an electrical pulse to a subset of magnetic tunnel junctions corresponding to the unobserved node. The electrical pulse applied programs information identifying the estimated probabilistic belief state in the subset of magnetic tunnel junctions corresponding to the unobserved node.

FIG. 1 illustrates a probabilistic graphical model (PGM) 50. The PGM 50 comprises multiple nodes 51, such as nodes A, B, C, and D. Each node 51 represents a random variable.

The PGM 50 further comprises multiple edges 52 interconnecting the nodes 51. Each edge 52 represents a dependency. The edges 52 in a PGM 50 may be directed (e.g., Bayesian networks) or undirected (e.g., Markov networks). As shown in FIG. 1, the nodes 51 of the PGM 50 are arranged in a directed acyclic graph to form a Bayesian network. Node C depends on node A and node B, and node D depends on node B and node C.

In a Bayesian network, each node 51 has a corresponding belief state that represents the conditional probability distribution of said node 51. A node 51 of the PGM 50 may be classified as either an observed (i.e., evidence) node 51A or an unobserved (i.e., hidden) node 51B. An observed node 51A has an observed belief state that is based on known information (i.e., evidence). An unobserved node 51B has an inferred belief state that is estimated based on the observed belief states of interconnected observed nodes 51A. As shown in FIG. 1, nodes A and D are observed nodes 51A. Nodes B and C are unobserved nodes 51B.

Embodiments of the present invention provide a compact method of implementing a stochastic network using an array of magnetic tunnel junctions (MTJs).

Figure 2:
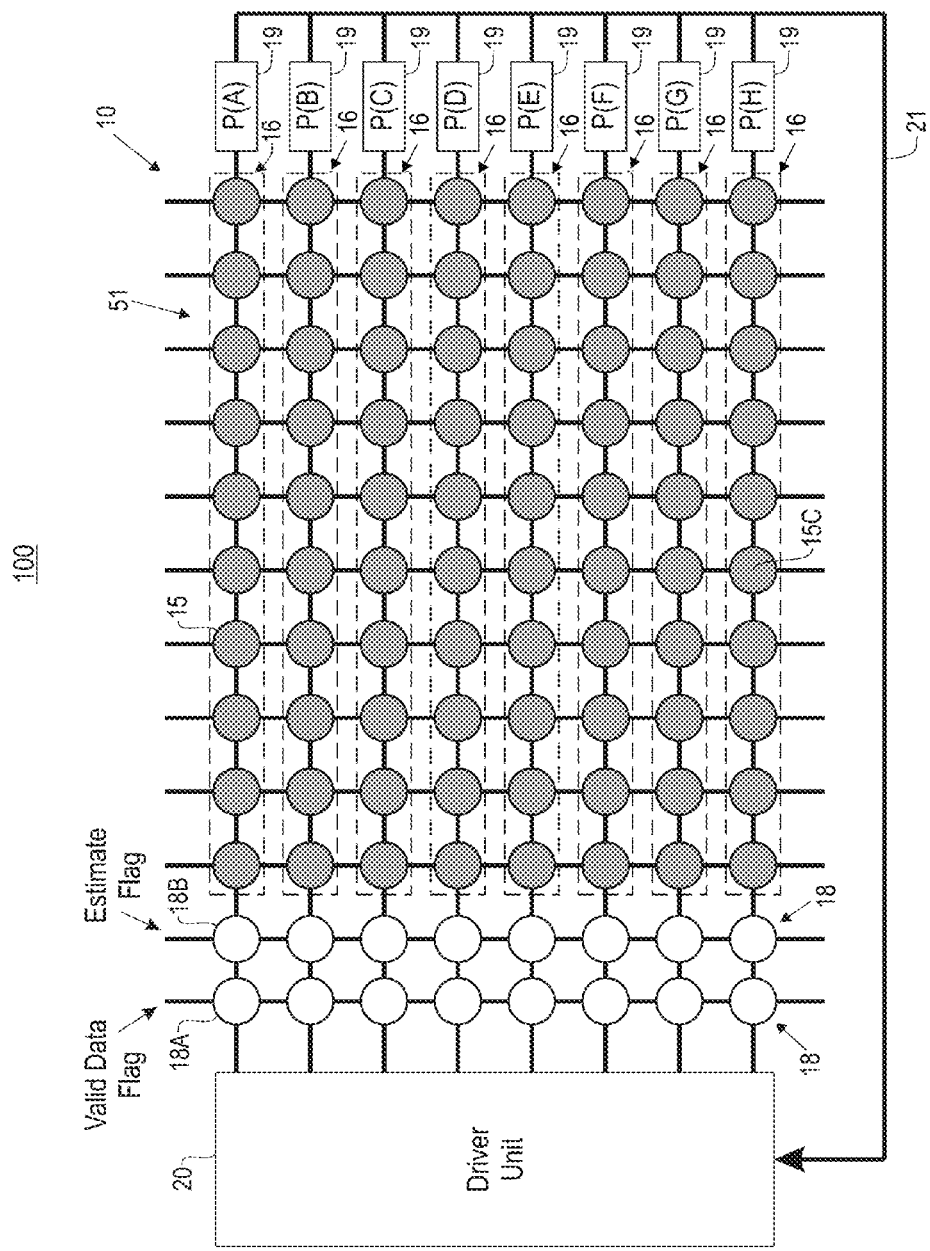
FIG. 2 illustrates a stochastic network, in accordance with an embodiment of the invention.
Figure 5:
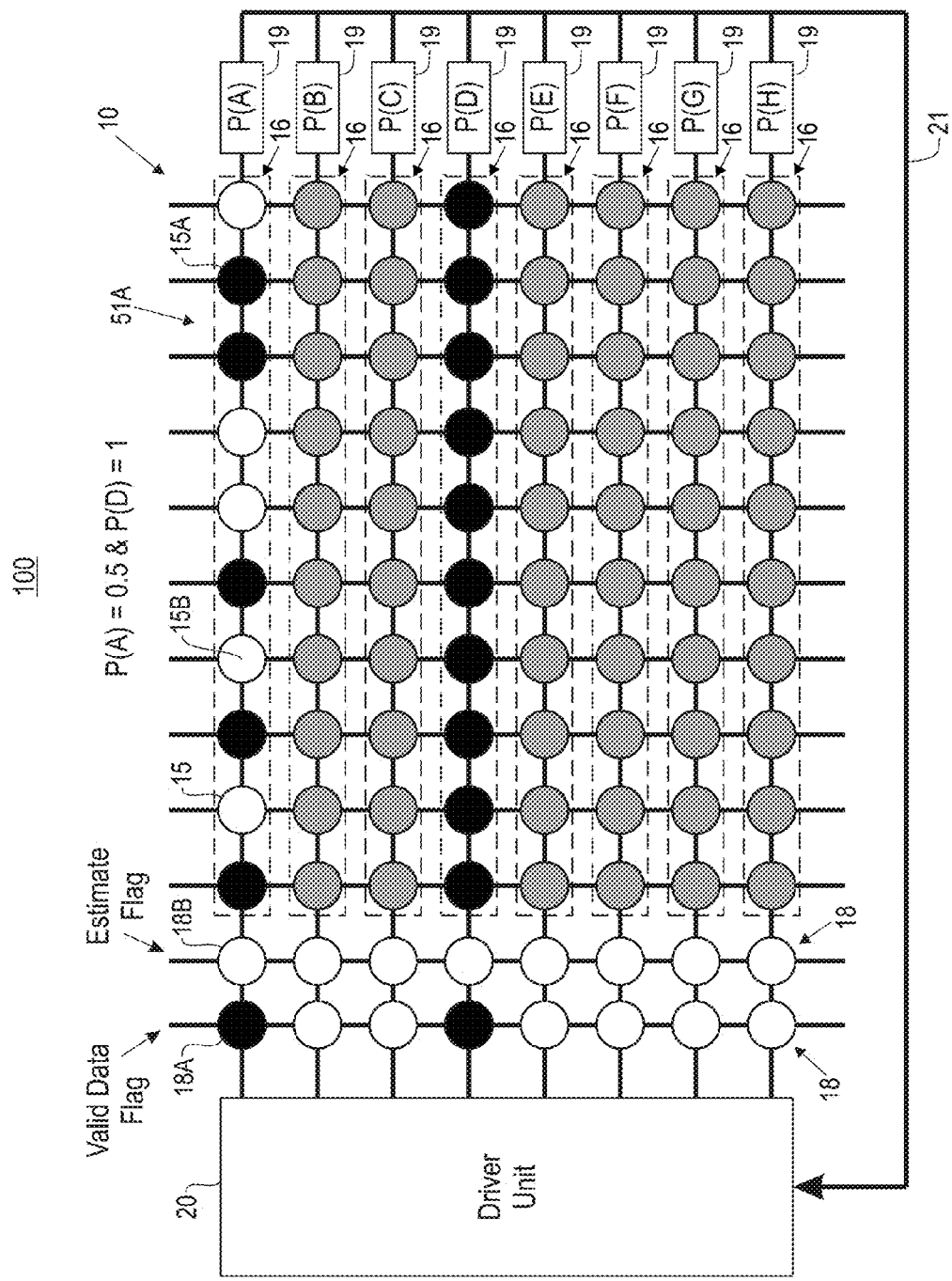
FIG. 5 illustrates a stochastic network, wherein some subsets of the network have been programmed based on known information, in accordance with an embodiment of the invention.

FIG. 2 illustrates a stochastic network 100, in accordance with an embodiment of the invention. The network 100 comprises a memory array 10 of MTJs 15. Each MTJ 15 consists of two layers of magnetic metal (e.g., ferromagnet) separated by a thin insulator. Each MTJ 15 may be programmed to switch between different levels of resistivity by applying an electrical pulse. For example, each MTJ 15 may be programmed to switch between a high resistivity state 15A (FIG. 5) and a low resistivity state 15B (FIG. 5).

The MTJs 15 of the array 10 may be organized/divided into multiple subsets 16 of MTJs 15. Each subset 16 represents a node 51 (i.e., a random variable). The MTJs 15 of each subset 16 may be programmed to maintain stochastic information relating to a belief state, wherein the probability value encoded by said subset 16 is maintained in a data unit 19.

The PGM 50 shown in FIG. 1 may be implemented using the network 100 shown in FIG. 2. For example, a first subset 16, a second subset 16, a third subset 16, and a fourth subset 16 of the array 10 may be programmed to maintain stochastic information for the nodes A, B, C, and D of the PGM 50, respectively. Data units 19 labeled as P(A), P(B), P(C), and P(D) in FIG. 2 maintain the probability values of the nodes A, B, C, and D, respectively.

As shown in FIG. 2, the network 100 may include additional subsets 16, such as fifth subset 16, a sixth subset 16, a seventh subset 16, and an eight subset 16. These additional subsets 16 may be used in the context of a larger PGM 50, such as implementing a PGM 50 including nodes A, B, . . . , and H using the network 100.

The network 100 further comprises a driver unit 20 configured to generate and selectively apply an electrical pulse to at least one subset 16 of the array 10. As described in detail later herein, the magnitude (i.e., current or voltage) and pulse width (i.e., duration) of an electrical pulse applied to a subset 16 sets the stochastic information that the MTJs 15 of the subset 16 are programmed to maintain. A electrical pulse applied to a subset 16 may program each MTJ 15 in the subset 16 to one of the following levels of resistivity: a high resistance state 15A (FIG. 5) or a low resistance state 15B (FIG. 5).

In one embodiment, each subset 16 has one or more corresponding flags 18. For example, as shown in FIG. 2, each subset 16 has a corresponding valid data flag 18A and a corresponding estimate flag 18B. Only one flag 18 may be set for each subset 16. The valid data flag 18A for a subset 16 is set (FIG. 5) when the stochastic information maintained in the subset 16 represents an observed belief state (i.e., the subset 16 represents an observed node 51A). The estimate flag 18B for a subset 16 is set (FIG. 5) when the stochastic information maintained in the subset 16 is an inferred belief state (i.e., the subset 16 represents an unobserved node 51B). An inference algorithm (e.g., loopy belief propagation, clique tree message passing, gibbs sampling, metropolis-hastings, etc.) may be used to estimate the belief states for the subsets 16 that represent unobserved nodes 51B.

In one embodiment, each flag 18 may be a MTJ 15 of the array 10. In one example implementation, a flag 18 is set when the flag 18 is programmed to the high resistivity state 15A. In another example implementation, a flag 18 is set when the flag 18 is programmed to the low resistivity state 15B.

The network 100 further comprises a data path 21 that communicates the probability values maintained in the data units 19 to the driver unit 20.

Figure 3:
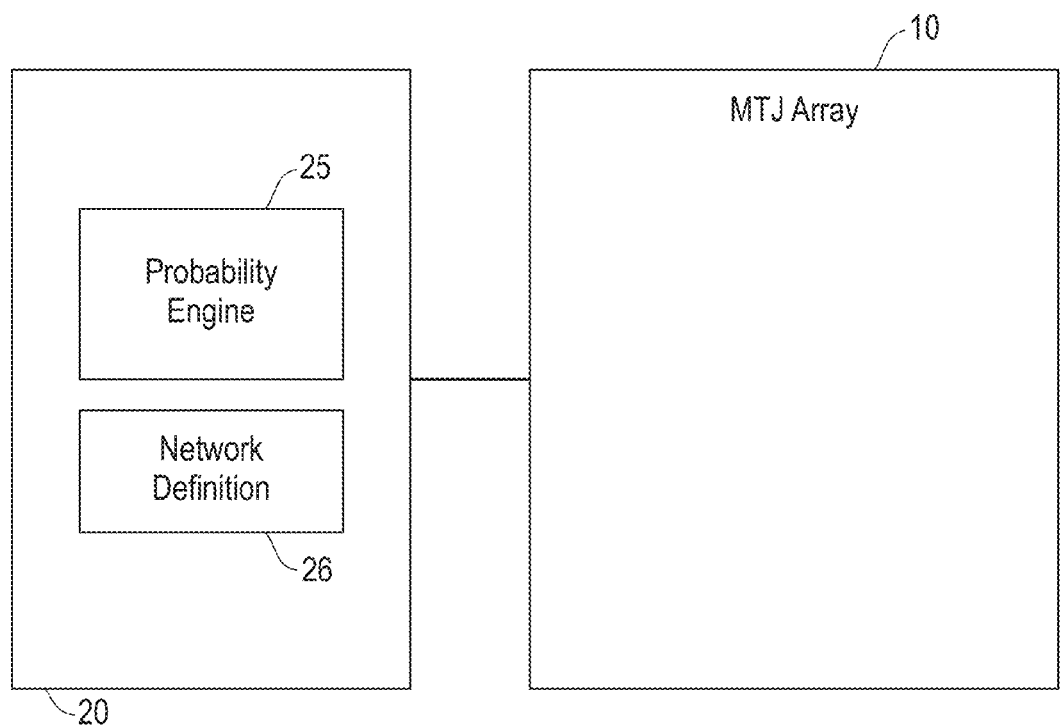
FIG. 3 illustrates a block diagram of a stochastic network, in accordance with an embodiment of the invention.

FIG. 3 illustrates a block diagram of a stochastic network 100, in accordance with an embodiment of the invention. As stated above, the driver unit 20 is configured to generate and selectively apply an electrical pulse to one or more subsets 16 of the array 10. As shown in FIG. 3, the driver unit 20 comprises a probability engine module 25 and a network definition module 26. The network definition module 26 maintains configurable network definition data for a PGM 50. The network definition data may include the following: the number of nodes 51 within the PGM 50, connectivity information such as the edges 52 interconnecting the nodes 51 of the PGM 50, and any known information (i.e., evidence) for observed nodes 51A of the PGM 50. The network definition module 26 further maintains an inference algorithm that is utilized when estimating belief states for unobserved nodes 51B of the PGM 50.

An operator may load a network definition file including the network definition data into the network definition module 26. Prior to loading the network 100 with network definition data, the MTJs 15 of each subset 16 is in a random state 15C (FIG. 2). A random state 15C may be any one of the following: a high resistivity state 15A or a low resistivity state 15B.

The probability engine module 25 is used to determine the magnitude and pulse width of an electrical pulse applied to a subset 16. The magnitude and the pulse width of an electrical pulse applied to a subset 16 sets the probability value encoded in the subset 16. The probability engine module 25 relies on network definition data and/or an inference algorithm to determine the magnitude and the pulse width of an electrical pulse. In a preferred embodiment, electrical pulse widths and current magnitudes are used to encode probability values.

Figure 4:
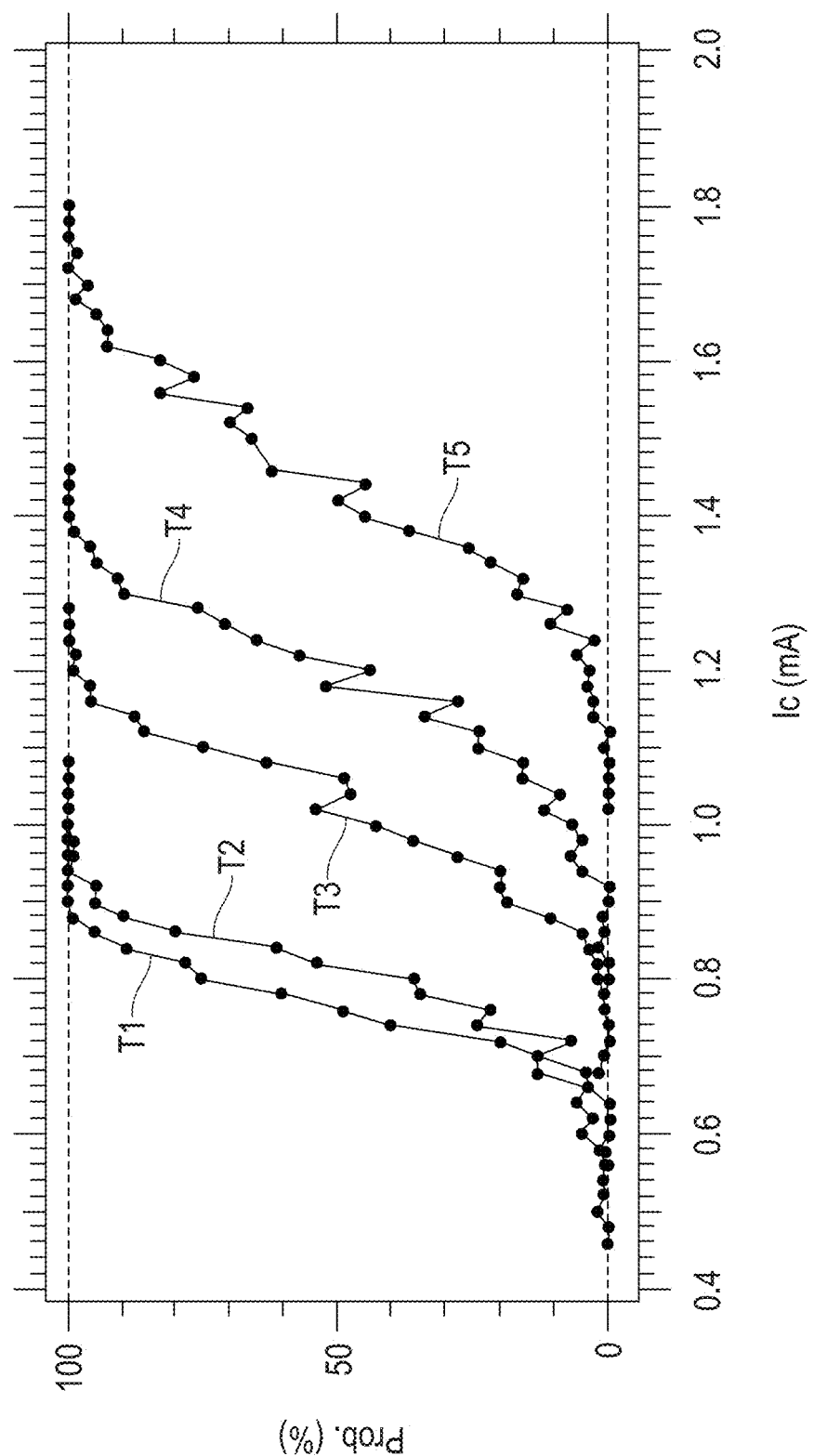
FIG. 4 illustrates an example graph plotting different electric current-probability curves for different electrical pulse widths, in accordance with an embodiment of the invention.

FIG. 4 illustrates an example graph plotting different electric current-probability curves for different electrical pulse widths. In FIG. 4, a first curve T1 represents the current-probability curve for an electrical pulse with a 100 millisecond pulse width, a second curve T2 represents the current-probability curve for an electrical pulse with a 10 millisecond pulse width, a third curve T3 represents the current-probability curve for an electrical pulse with a 1 millisecond pulse width, a fourth curve T4 represents the current-probability curve for an electrical pulse with a 0.1 millisecond pulse width, and a fifth curve T5 represents the current-probability curve for an electrical pulse with a 0.01 millisecond pulse width. As shown in FIG. 4, the current magnitude required to encode a specific probability value increases as the pulse width decreases.

FIG. 5 illustrates a stochastic network 100, wherein some subsets 16 of the network 100 are programmed to maintain observed belief states, in accordance with an embodiment of the invention. The network 100 may be configured to represent the PGM 50 shown in FIG. 1 by loading network definition data for the PGM 50 in FIG. 1 in the driver unit 20. The first subset 16, the second subset 16, the third subset 16, and the fourth subset 16 of the array 10 may be programmed to maintain stochastic information for the nodes A, B, C, and D of the PGM 50, respectively.

As stated earlier, the network definition data may include known information (i.e., evidence) for observed nodes 51A. For example, known information may provide the probability values of 0.5 and 1 for the observed nodes A and D, respectively. Based on the known information, the network 100 encodes the first subset 16 and the fourth subset 16 with the probability values 0.5 and 1, respectively.

Specifically, to encode the first subset 16 with the probability value 0.5, fifty percent (50%) of the MTJs 15 of the first subset 16 must be programmed to a first level of resistivity (e.g., high resistance state 15A), and the remaining fifty percent (50%) of the MTJs 15 of the first subset 16 must be programmed to a different level of resistivity (e.g., low resistance state 15B). In one example implementation, the probability engine module 25 is used to determine a magnitude $I_A$ and a pulse width $t_A$ of an electrical pulse that will program fifty percent (50%) of the MTJs 15 of the first subset 16 to the high resistance state 15A and the remaining fifty percent (50%) of the MTJs 15 of the first subset 16 to the low resistance state 15B. The driver unit 20 then applies a first electrical pulse with determined magnitude $I_A$ and the determined pulse width $t_A$ to the first subset 16. As shown in FIG. 5, fifty percent (50%) of the MTJs 15 of the first subset 16 are in the high resistance state 15A and the remaining fifty percent (50%) of the MTJs 15 of the first subset 16 are in the low resistance state 15B.

Further, to encode the fourth subset 16 with the probability value 1, all MTJs 15 of the fourth subset 16 must be programmed to the same level of resistivity. In one example implementation, the probability engine module 25 is used to determine a magnitude $I_D$ and a pulse width $t_D$ of an electrical pulse that will program all MTJs 15 of the fourth subset 16 to the high resistance state 15A. The driver unit 20 then applies a second electrical pulse with determined magnitude $I_D$ and the determined pulse width $t_D$ to the fourth subset 16. As shown in FIG. 5, all MTJs 15 of the fourth subset 16 are in the high resistance state 15A. In another example implementation, the probability engine module 25 is used to determine a magnitude $I_D$ and a pulse width $t_D$ of an electrical pulse that will program all MTJs 15 of the fourth subset 16 to the low resistance state 15B.

The first electrical pulse (with determined magnitude $I_A$ and the determined pulse width $t_A$) and the second electrical pulse (with determined magnitude $I_D$ and the determined pulse width $t_D$) may be applied in parallel or sequentially.

The driver unit 20 may also be configured to set the valid data flag 18A for the first subset 16 and the fourth subset 16.

Figure 6:
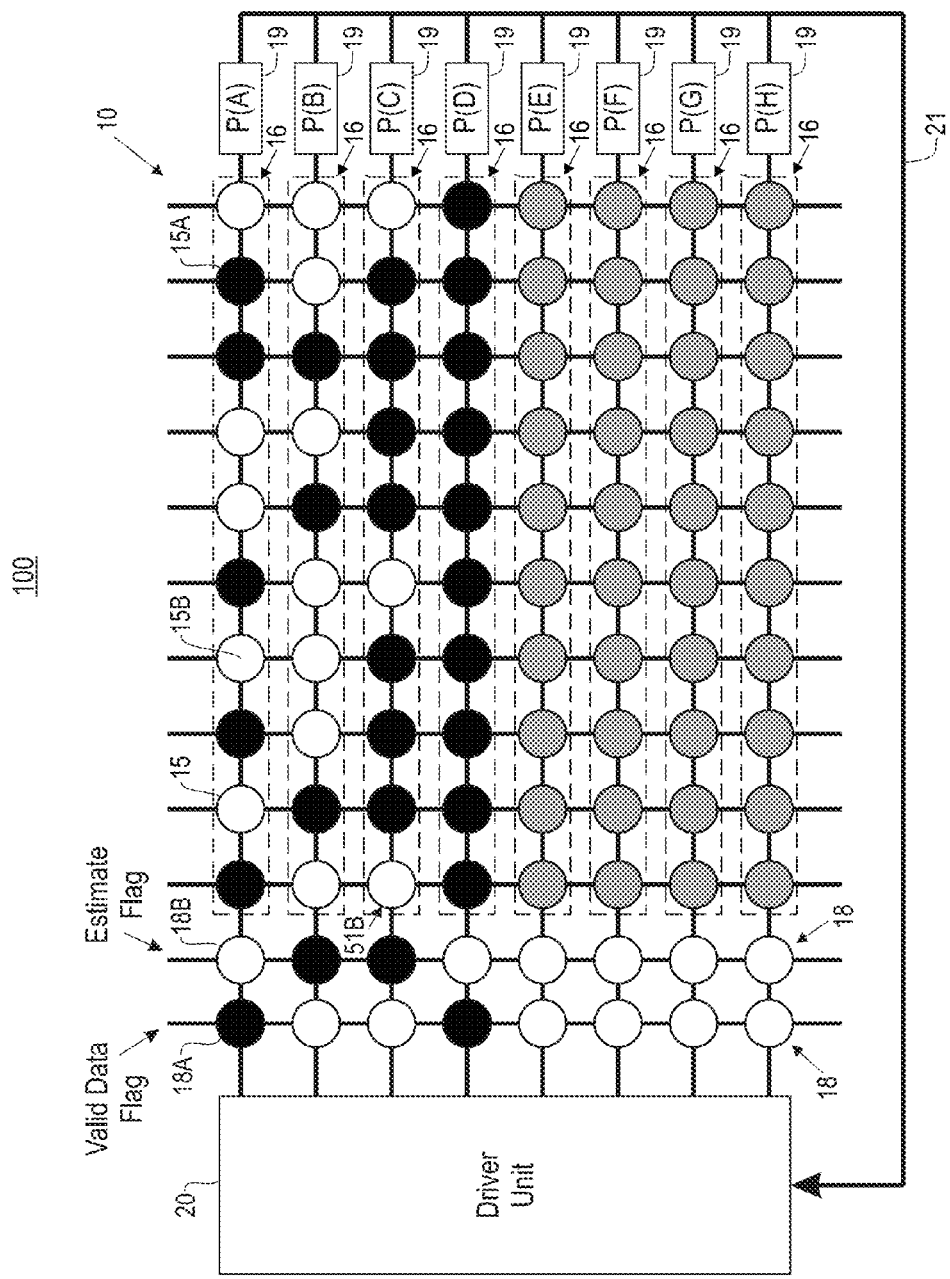
FIG. 6 illustrates a stochastic network, wherein some subsets of the network have been programmed to maintain estimated belief states, in accordance with an embodiment of the invention.

FIG. 6 illustrates a stochastic network 100, wherein some subsets 16 of the network 100 are programmed to maintain estimated belief states, in accordance with an embodiment of the invention. The network 100 propagates inferred belief states to the unobserved nodes 51B. The driver unit 20 estimates belief states for the unobserved nodes 51B based on network definition data and/or an inference algorithm maintained in the network definition module 26. In one embodiment, the inference algorithm takes into account the probability values encoded in the data units 19.

As shown in FIG. 6, the network 100 propagates estimated belief states to the second and third subsets 16 representing to unobserved nodes B and C, respectively. Specifically, the driver unit 20 generates and applies an electrical pulse with a magnitude $I_B$ and pulse width $t_B$ to the second subset 16 to encode the second subset 16 with the estimated belief state for the unobserved node B. Similarly, the driver unit 20 generates and applies a different electrical pulse with a magnitude $I_C$ and pulse width $t_C$ to the third subset 16 to encode the third subset 16 with the estimated belief state for the unobserved node C.

The driver unit 20 may also be configured to set the estimate flag 18B for the second subset 16 and the third subset 16.

In one embodiment, the propagation of estimated belief states for unobserved nodes 51B takes place during just a single time step. In another embodiment, the propagation of estimated belief states for unobserved nodes 51B takes place over multiple time steps.

Figure 7:
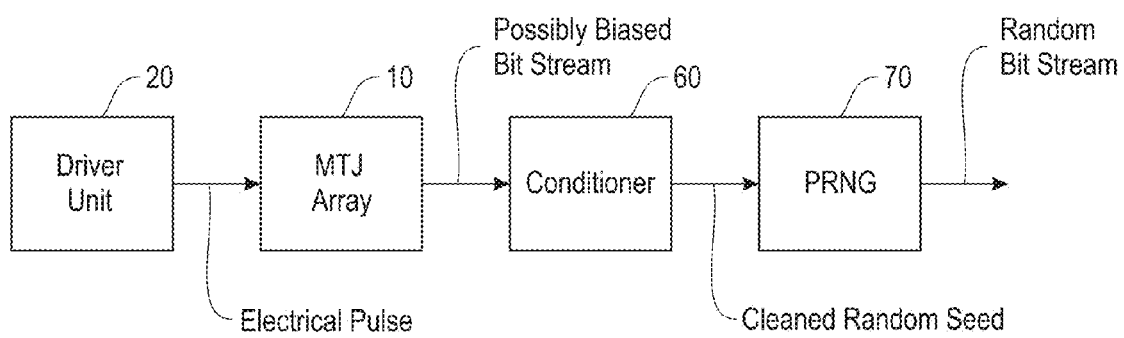
FIG. 7 illustrates a stochastic network including a pseudo random number generator (PRNG), in accordance with an embodiment of the invention.

FIG. 7 illustrates a stochastic network 200 including a pseudo random number generator (PRNG) 70, in accordance with an embodiment of the invention. The network 200 comprises a driver unit 20, an array 10 of MTJs 15, a conditioner module 60, and a PRNG 70. In one embodiment, the driver unit 20 and the array 10 may be used in conjunction with a PRNG 70 to improve randomness generation.

Specifically, the driver unit 20 generates electrical pulses used to program information in the array 10. In one embodiment, an MTJ 15 in the high resistance state 15A is used to represent a binary 1, and an MTJ 15 in the low resistance state 15B is used to represent a binary 0.

The conditioner module 60 is configured to derive a cleaned random seed from a possibly biased bit stream extracted from the array 10. The PRNG 70 is configured to generate a random bit stream using the cleaned random seed.

Figure 8:
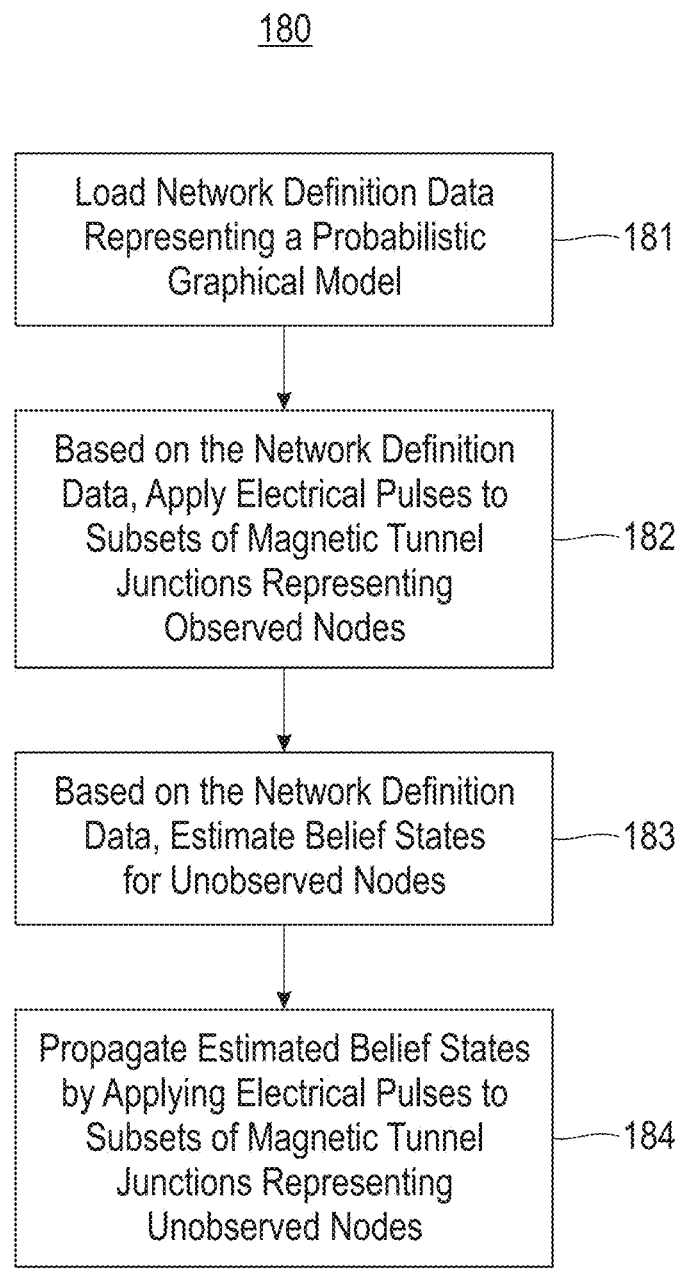
FIG. 8 is a flowchart of an example process for propagating estimated belief states, in accordance with an embodiment of the invention.

FIG. 8 is a flowchart of an example process 180 for propagating estimated belief states, in accordance with an embodiment of the invention. In process block 181, load the stochastic network with network definition data representing a PGM. In process block 182, apply electrical pulses to subsets of MTJs that represent observed nodes of the PGM, wherein the magnitude and pulse width of the electrical pulses applied is based on the network definition data. In process block 183, estimate belief states for unobserved nodes of the PGM based on the network definition data. In process block 184, propagate estimated belief states by applying electrical pulses to subsets of MTJs that represent unobserved nodes of the PGM.

Figure 9:
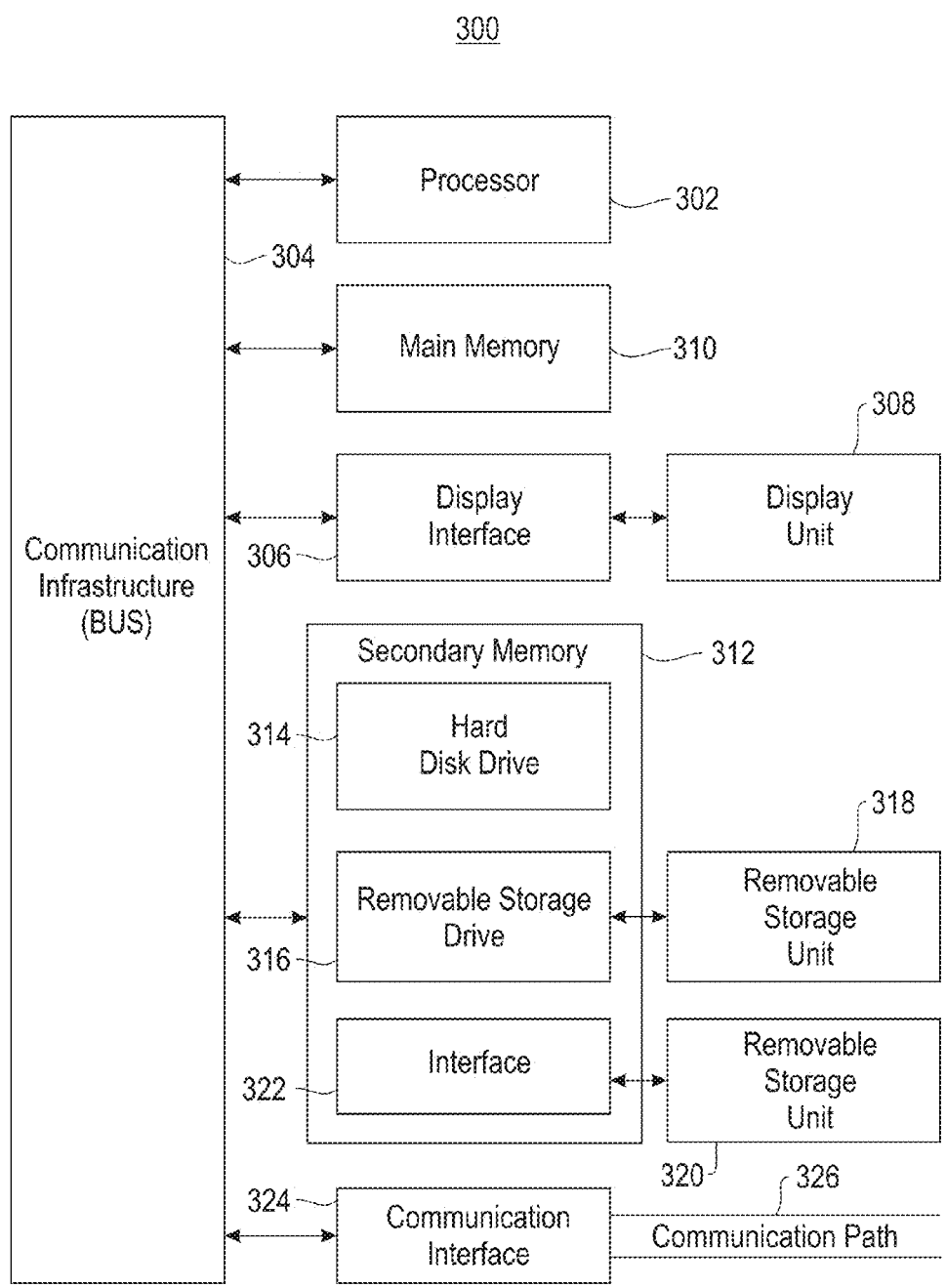
FIG. 9 is a high level block diagram showing an information processing system useful for implementing one embodiment of the present invention.

FIG. 9 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for implementing stochastic networks using a memory array of magnetic tunnel junctions. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A device, comprising:
a processor;
a memory array of magnetic tunnel junctions, wherein the magnetic tunnel junctions are organized into multiple subsets of magnetic tunnel junctions; and
a driver unit that programs the memory array to represent a probabilistic graphical model comprising at least one observed node and at least one unobserved node, wherein the driver unit is configured to:
load information representing the probabilistic graphical model;
based on the information representing the probabilistic graphical model, program at least one subset of magnetic tunnel junctions with information representing an observed probabilistic belief state;
based on the information representing the probabilistic graphical model, estimate at least one probabilistic belief state;
propagate the at least one estimated probabilistic belief state to at least one other subset of magnetic tunnel junctions by programming the at least one other subset of magnetic tunnel junctions with information representing the at least one estimated probabilistic belief state; and for each subset of magnetic tunnel junctions, selectively set one of a pair of flags corresponding to said subset of magnetic tunnel junctions, such that said set flag identifies information programmed into said subset of magnetic tunnel junctions as one of an observed probabilistic belief state for an observed node and an estimated probabilistic belief state for an unobserved node;

wherein each subset of magnetic tunnel junctions has a corresponding data unit for maintaining a probability value representing a probabilistic belief state of said subset of magnetic tunnel junctions, and each magnetic tunnel junction of said subset of magnetic tunnel junctions is programmed to a same level of resistivity or a different level of resistivity based on the probability value; and wherein each estimated probabilistic belief state is further based on each probability value maintained in each data unit corresponding to each subset of magnetic tunnel junctions.

2. The device of claim 1, wherein:
the probabilistic graphical model comprises multiple nodes interconnected via multiple edges; and
each subset of magnetic tunnel junctions corresponds to a node of the probabilistic graphical model.

3. The device of claim 2, wherein:
the driver unit maintains configurable network definition data relating to the probabilistic graphical model.

4. The device of claim 3, wherein:
each electrical pulse applied by the driver unit has a corresponding magnitude and a corresponding pulse width, wherein the corresponding magnitude and the corresponding pulse width of said electrical pulse is based on the network definition data maintained.

5. The device of claim 4, wherein:
the network definition data maintained includes edge connectivity information for said multiple nodes of the probabilistic graphical model.

6. The device of claim 5, wherein:
said multiple nodes of the probabilistic graphical model include at least one observed node and at least one unobserved node;
wherein each observed node has an observed probabilistic belief state; and
wherein each unobserved node has an estimated probabilistic belief state.

7. The device of claim 6, wherein:
the network definition data maintained further includes evidence information for each observed node of the probabilistic graphical model.

8. The device of claim 7, wherein:
for each observed node of the probabilistic graphical model:
the driver unit applies an electrical pulse to a subset of magnetic tunnel junctions corresponding to said observed node, wherein the electrical pulse applied programs information representing an observed probabilistic belief state in said subset of magnetic tunnel junctions, and wherein the observed probabilistic belief state is based on evidence information for said observed node.

9. The device of claim 8, wherein:
for each unobserved node of the probabilistic graphical model:

the driver unit estimates a probabilistic belief state for said unobserved node based on an inference algorithm and the network definition data maintained; and the driver unit applies an electrical pulse to a subset of magnetic tunnel junctions corresponding to said unobserved node, wherein the electrical pulse applied programs information identifying the estimated probabilistic belief state in said subset of magnetic tunnel junctions.

10. The device of claim 2, wherein:
the edges of the probabilistic graphical model are arranged in a directed acyclic graph.

11. A method for programming magnetic tunnel junctions of a memory array, comprising:
organizing the magnetic tunnel junctions of the memory array into multiple subsets of magnetic tunnel junctions;
maintaining information relating to a probabilistic graphical model in a hardware memory device of a driver unit, wherein the probabilistic graphical model comprises at least one observed node and at least one unobserved node; and
programming the memory array to represent the probabilistic graphical model by utilizing the driver unit to:
load the information maintained in the memory device of the driver unit;
program, based on the information maintained in the memory device of the driver unit, at least one subset of magnetic tunnel junctions with information representing an observed probabilistic belief state;
based on the information maintained in the memory device of the driver unit, estimate at least one probabilistic belief state;
propagate the at least one estimated probabilistic belief state to at least one other subset of magnetic tunnel junctions by programming the at least one other subset of magnetic tunnel junctions with information representing the at least one estimated probabilistic belief state; and
for each subset of magnetic tunnel junctions, selectively set one of a pair of flags corresponding to said subset of magnetic tunnel junctions, such that said set flag identifies information programmed into said subset of magnetic tunnel junctions as one of an observed probabilistic belief state for an observed node and an estimated probabilistic belief state for an unobserved node;

wherein each subset of magnetic tunnel junctions has a corresponding data unit for maintaining a probability value representing a probabilistic belief state of said subset of magnetic tunnel junctions, and each magnetic tunnel junction of said subset of magnetic tunnel junctions is programmed to a same level of resistivity or a different level of resistivity based on the probability value; and wherein each estimated probabilistic belief state is further based on each probability value maintained in each data unit corresponding to each subset of magnetic tunnel junctions.

12. The method of claim 11, wherein:
maintaining information relating to a probabilistic graphical model in a memory device of a driver unit comprises maintaining configurable network definition data relating to the probabilistic graphical model in the memory device of the driver unit.

13. The method of claim 12, wherein the network definition data maintained includes connectivity information and evidence information for the probabilistic graphical model.

14. The method of claim 13, further comprising:
determining a magnitude and a pulse width for an electrical pulse based on the network definition data maintained; and
applying an electrical pulse with the determined magnitude and pulse width to a subset of magnetic tunnel junctions.

15. The method of claim 14, further comprising:
programming information representing an observed probabilistic belief state in a subset of magnetic tunnel junctions by applying an electrical pulse to said subset of magnetic tunnel junctions, wherein the observed probabilistic belief state is based on the evidence information maintained.

16. The method of claim 15, further comprising:
estimating a probabilistic belief state based on an inference algorithm and the network definition data maintained; and
programming information representing the estimated probabilistic belief state in a subset of magnetic tunnel junctions by applying an electrical pulse to said subset of magnetic tunnel junctions.

17. A non-transitory computer-useable storage medium for a memory array of magnetic tunnel junctions, the computer-useable storage medium having a computer-readable program, wherein the program upon being processed on a computer causes the computer to:
arrange the magnetic tunnel junctions of the memory array into multiple subsets of magnetic tunnel junctions; and
program the memory array to represent a probabilistic graphical model comprising at least one observed node and at least one unobserved node by:
loading information representing the probabilistic graphical model;
based on the information representing the probabilistic graphical model, programming at least one subset of magnetic tunnel junctions with information representing an observed probabilistic belief state;
based on the information representing the probabilistic graphical model, estimating at least one probabilistic belief state;
propagating the at least one estimated probabilistic belief state to at least one other subset of magnetic tunnel junctions by programming the at least one other subset of magnetic tunnel junctions with information representing the at least one estimated probabilistic belief state; and
for each subset of magnetic tunnel junctions, selectively setting one of a pair of flags corresponding to said subset of magnetic tunnel junctions, such that said set flag identifies information programmed into said subset of magnetic tunnel junctions as one of an observed probabilistic belief state for an observed node and an estimated probabilistic belief state for an unobserved node;
wherein each subset of magnetic tunnel junctions has a corresponding data unit for maintaining a probability value representing a probabilistic belief state of said subset of magnetic tunnel junctions, and each magnetic tunnel junction of said subset of magnetic tunnel junctions is programmed to a same level of resistivity or a different level of resistivity based on the probability value; and
wherein each estimated probabilistic belief state is further based on each probability value maintained in each data unit corresponding to each subset of magnetic tunnel junctions.

18. The program of claim 17, further causing the computer to:
maintaining configurable network definition data relating to the probabilistic graphical model.

19. The program of claim 18, further causing the computer to:
program information representing an observed probabilistic belief state in a subset of magnetic tunnel junctions by applying an electrical pulse to said subset of magnetic tunnel junctions, wherein the observed probabilistic belief state is based on the evidence information maintained.

20. The program of claim 19, further causing the computer to:
estimate a probabilistic belief state based on an inference algorithm and the network definition data maintained; and
program information representing the estimated probabilistic belief state in a subset of magnetic tunnel junctions by applying an electrical pulse to said subset of magnetic tunnel junctions.

* * * * *